(12) United States Patent
Legallais et al.

(10) Patent No.: US 7,277,402 B2
(45) Date of Patent: Oct. 2, 2007

(54) METHOD FOR ISOCHRONOUS RESOURCE MANAGEMENT IN A NETWORK BASED ON HIPERLAN 2 TECHNOLOGY

(75) Inventors: Yvon Legallais, Rennes (FR); Gilles Straub, Acigné (FR); Christophe Vincent, Gahard (FR)

(73) Assignee: Thomson Licensing, Boulogne-Billancourt (FR)

( * ) Notice: Subject to any disclaimer, the term of this patent is extended or adjusted under 35 U.S.C. 154(b) by 1084 days.

(21) Appl. No.: 10/181,881

(22) PCT Filed: Jan. 26, 2001

(86) PCT No.: PCT/EP01/00941

§ 371 (c)(1),
(2), (4) Date: Oct. 1, 2002

(87) PCT Pub. No.: WO01/56226

PCT Pub. Date: Aug. 2, 2001

(65) Prior Publication Data

US 2003/0078063 A1    Apr. 24, 2003

(30) Foreign Application Priority Data

Jan. 27, 2000    (EP) ................... 00400220

(51) Int. Cl.
*H04B 7/00*    (2006.01)
*H04Q 7/20*    (2006.01)
*H04L 12/18*    (2006.01)
*H04M 3/42*    (2006.01)
*G06F 15/173*    (2006.01)

(52) U.S. Cl. ............... 370/260; 370/312; 370/329; 370/432; 379/202; 455/416; 455/518; 709/204; 709/226

(58) Field of Classification Search ............... 370/260, 370/312, 329, 432; 379/202; 455/416, 518; 709/204, 226
See application file for complete search history.

(56) References Cited

U.S. PATENT DOCUMENTS 5,461,611 A * 10/1995 Drake et al. ............... 370/420

(Continued)

FOREIGN PATENT DOCUMENTS

EP    0766428    4/1997

(Continued)

OTHER PUBLICATIONS

David V James: "Wireless Hiperlan-2 Layer", P1394.1, Draft Standard for High Performance Serial Bus Bridges, IEEE, New York, NY US, Oct. 12, 1999, p. 13941.

*Primary Examiner*—Alpus H. Hsu
(74) *Attorney, Agent, or Firm*—Joseph J. Laks; Robert D. Shedd; Paul P. Kiel

(57) ABSTRACT

A device and method for reserving isochronous resources on a wireless network for connection set-up, where the wireless network includes an isochronous resource manager. The device and method include identifying a talker device and a listener device by a connection controller; acquiring, by the isochronous resource managers, a list of devices to be part of the connection; determining bandwidth required for connecting the talker device and the listener device by the isochronous resource manager, as a function of the list of devices to be part of the connection; and setting-up a multicast group including the talker device and the listener device if the bandwidth is available.

13 Claims, 7 Drawing Sheets

U.S. PATENT DOCUMENTS

| | | | |
|---|---|---|---|
| 5,815,678 A * | 9/1998 | Hoffman et al. | 710/305 |
| 5,825,752 A * | 10/1998 | Fujimori et al. | 370/260 |
| 6,389,502 B1 * | 5/2002 | Toguchi | 710/314 |
| 6,408,355 B1 * | 6/2002 | Toguchi | 710/314 |
| 6,434,117 B1 * | 8/2002 | Momona | 370/236 |
| 6,445,711 B1 * | 9/2002 | Scheel et al. | 370/402 |
| 6,539,450 B1 * | 3/2003 | James et al. | 710/306 |
| 6,728,821 B1 * | 4/2004 | James et al. | 710/306 |
| 6,738,816 B1 * | 5/2004 | Momona | 709/226 |
| 7,007,078 B2 * | 2/2006 | Matsuda | 709/220 |
| 2002/0167953 A1 * | 11/2002 | Scheel et al. | 370/401 |

FOREIGN PATENT DOCUMENTS

EP　　　　1081896　　　3/2001

* cited by examiner

| Reserved (27) | Generation Number (5) |
|---|---|
| Channel_available ||

32

Definition

| Bandwidth Available |
|---|
| 32 |

Read Value

| Rsv | Bandwidth Available |
|---|---|
| 5 | 26 |

Lock Effect

| Generation number | Data Rate Request |
|---|---|
| 5 | 26 |

Fig. 5

| On-Line | Point to Point Connection Counter | Generation Number | Channel Number | Reserved | Reserved |
|---|---|---|---|---|---|
| 1 | 6 | 5 | 6 | 5 | 8 |

Fig. 6

| On-Line | Point to Point Connection Counter | Generation Number | Channel Number | Overhead ID | Payload |
|---------|-----------------------------------|-------------------|----------------|-------------|---------|
| 1 | 6 | 5 | 6 | 4 | 10 |

METHOD FOR ISOCHRONOUS RESOURCE MANAGEMENT IN A NETWORK BASED ON HIPERLAN 2 TECHNOLOGY

This application claims the benefit, under 35 U.S.C. § 365 of International Application PCT/EP01/00941, filed Jan. 26, 2001, which was published in accordance with PCT Article 21(2) on Aug. 2, 2001 in English and which claims the benefit of European patent application No. 00400220.0 filed Jan. 27, 2000.

The invention concerns a network of wired buses, such as buses conforming to IEEE 1394 standard, in which at least some buses are linked through wireless bridge connections forming a wireless network of the ETSI BRAN Hiperlan 2 type.

More specifically, the invention concerns a convergence layer for enabling devices to communicate over the wireless network.

The technical background regarding Hiperlan 2 and IEEE 1394 will first be described.

(1) Hiperlan 2 1394 Convergence Layer

Figure 1:
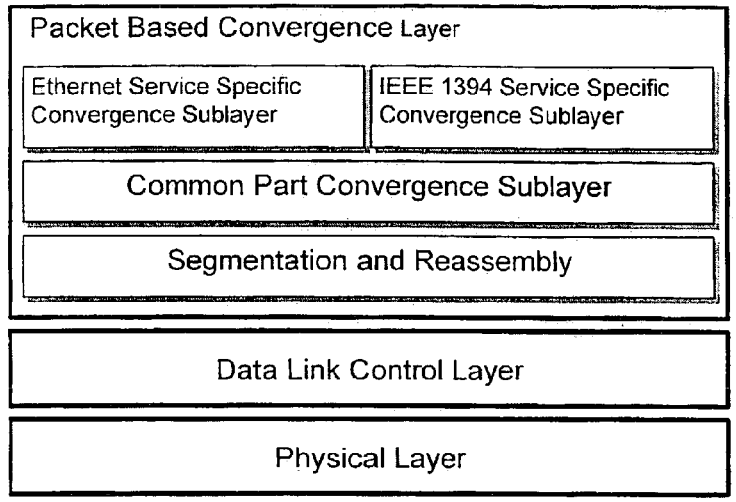

A new generation of Wireless LAN called Hiperlan 2 is being defined by the ETSI BRAN project. The so-called Hiperlan 2 systems are intended to operate in the 5 GHz band, the user mobility being restricted to the local service area. The Hiperlan 2 ('HL2') network standardizes the radio access network and some of the convergence layer functions to different core networks. FIG. 1 represents the general stack of Hiperlan 2.

In particular, the 1394 Convergence Layer (see references in the detailed description section: document [3]) aims at describing a safe mechanism to manage the isochronous connections in a wireless network.

The IEEE 1394 Convergence layer allows two kinds of devices to operate over HL2, i.e. wireless bridge devices and wireless non bridge devices.

(a) Wireless 1394 bridge devices. They contain bridge functions to allow wired IEEE 1394 devices (controller, talker or listener) to communicate over the Hiperlan 2 network. They provide a wired IEEE 1394 interface to allow the interconnection of IEEE 1394 serial buses over the HL2 network.

(b) Wireless 1394 non bridge devices. These devices do not contain any bridge function. They contain an IEEE 1394 application which can communicate with other IEEE 1394 applications over the Hiperlan 2 network.

In conformance with the IEEE P1394.1 document (see document [6] below), the bridge model is defined as a set of two and only two portals connecting two serial buses.

The IEEE 1394 Convergence layer emulates the services of a serial bus, so that both non bridge devices and bridge devices can share a same frequency.

Two 1394 applications should be able to operate directly over a HL2 network. The model also allows real wired bridge aware devices to wirelessly communicate using wireless bridges.

Figure 2:
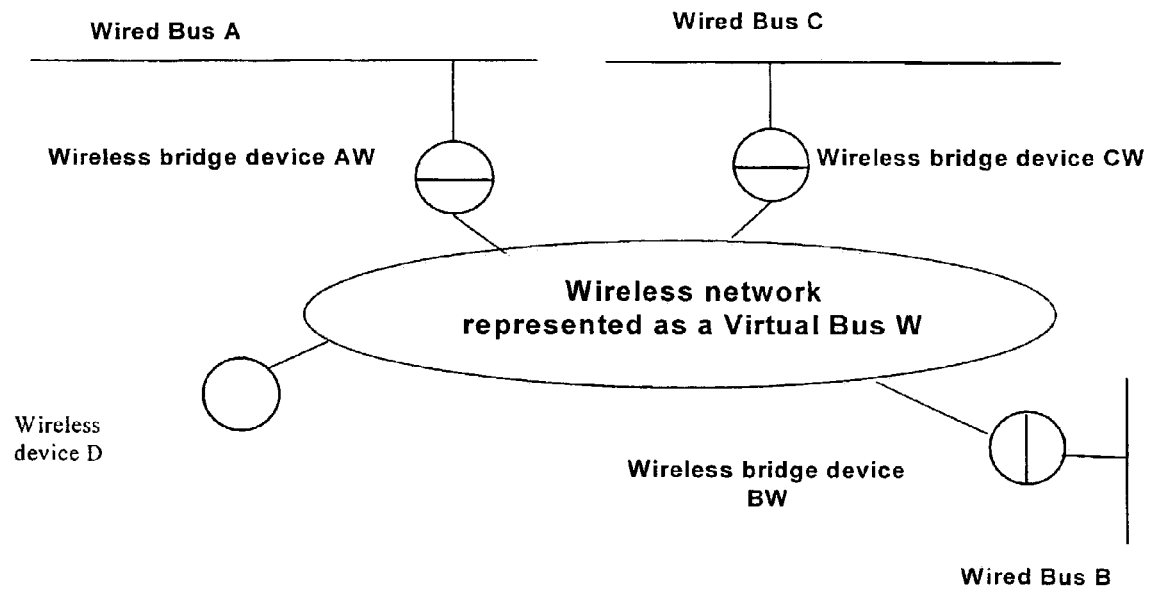

FIG. 2 shows an example of a Hiperian 2 network as a virtual IEEE 1394 bus. It comprises three wired 1394 busses (A, B and C), connected to a wireless bus W through respective bridge devices AW, BW and CW. A wireless device D is connected directly to the wireless bus W without being connected to a wired bus.

In HL2, every isochronous channel is set up by a RLC (Radio Link Control sublayer) multicast DLC (Data Link Control sublayer) User connection control procedure, involving the Central Controller. In HL2, there is a concept of link budget that depends on the radio reception quality of the involved devices. HL2 defines several modulation schemes that allow data exchange with a flexible robustness (the more robust the modulation scheme, the higher the required bandwidth). When one device wants to send data to another device, it shall know the link budget to decide which modulation scheme it shall use, and thus how much of the network resources it needs (in terms of HL2 time slots). In the DLC Home Extension (see reference of document [2] below), a calibration mechanism is defined so that the Central Controller can gain knowledge of the link budget for any kind of connection.

(2) IEEE 1394-1995 Serial Bus and IEC 61883 for transport of isochronous streams over a IEEE 1394 bus The management of the Isochronous resources in a Serial Bus is covered by the Isochronous Resource Manager (IRM) function described in the IEEE1394-1995 standard. The IRM is not really in charge of allocating bandwidth and channel but rather provides a single location where other nodes may cooperatively record their usage of isochronous resource.

The IEC 61883 standard (see reference of document [5] below) specifies the transmission protocol for audiovisual data between equipment connected to an IEEE 1394-1995 Serial Bus. It also specifies a protocol (Connection Management Procedure or 'CMP') so that nodes can cooperatively use the IRM to reserve bus resources. As specified by this protocol, when a Bus Reset occurs on a single serial bus, the following actions are performed:

All AV devices that had connected input and output plugs prior the bus reset shall continue respectively to receive and transmit isochronous data flow after the bus reset, during one second, according to values in the Plug Control Registers (cf. definition in [5]) which existed immediately before the bus reset.

Controllers that established connections before the bus reset have one second to reclaim resources. Unreclaimed resources are released by the IRM one second after the bus reset.

One second after the bus reset, all AV devices that had connected input and output plugs prior the bus reset are to behave according to the values in the corresponding plug control registers (these values may have been updated by some controllers).

This procedure guarantees that a bus connection established by a device (or application) is released if this device disappears and obviously if the source or the destination node disappears.

It means that after a bus reset, the isochronous streams are reestablished according to the presence or not of the devices involved in the connection.

Since the 1394 convergence layer aims at emulating a virtual serial bus, it is to provide a similar mechanism for the management of the isochronous connections in a Hiperlan 2 network. This mechanism shall provide the same kind of functions as those existing on a real serial bus. It shall also be easily mapable on the existing HL2 lower layer protocols (DLC/RLC).

The description below describes such a mechanism.

The invention as claimed concerns a method for reserving isochronous resources on a wireless network of the Hiperlan 2 type for connection set-up, said network comprising an isochronous resource manager, said method comprising the steps of:

identification of a talker device and a listener device by a connection controller;

acquisition by the isochronous resource manager of the list of the devices to be part of the connection determination of the bandwidth required for connecting the talker and the listener by the isochronous resource manager, as a function of the list of devices to be part of the connection;

set-up of a multicast group including the talker device and the listener device if said bandwidth is available.

According to an embodiment of the invention, the step of acquiring the list of devices to be part of the connection by the isochronous resource manager comprises the steps:

request of a channel identifier by the connection controller from the isochronous resource manager, transmission by the connection controller of the channel identifier to the talker device and the listener device, having each device carry out a radio link control layer group join procedure with the central controller of the network, based on the channel number, having the central controller attribute a multicast medium access control identifier to said group.

According to an embodiment of the invention, the method further comprises the steps of, after a reset of the wireless network, providing a first time interval (T) during which controllers are required to reclaim isochronous resources reserved before the reset, and providing a second time interval (ΔT) following the first interval and during which a controller may not make new reservations with the isochronous resource manager.

According to an embodiment of the invention, the second time interval is set to allow all devices of the network to finish their reset procedure after a network reset triggered by the central controller.

According to an embodiment of the invention, connection controllers comprise a register for storing the second time interval, this register being programmable by the central controller.

According to an embodiment of the invention, the method further comprises the steps of:

providing a bus generation register in each node, having the central controller update the content of the bus generation register of a node during a network reset, the new register content being sent in a network reset message to the node, having the isochronous resource manager test for the latest value of the bus generation register content in a resource request from a node and reject the request if the bus generation register content of the node is not correct.

It is to be noted that the notions of the additional safeguard period delta T and the bus generation number are inventions in their own right and might be claimed separately.

Figures 3, 4:
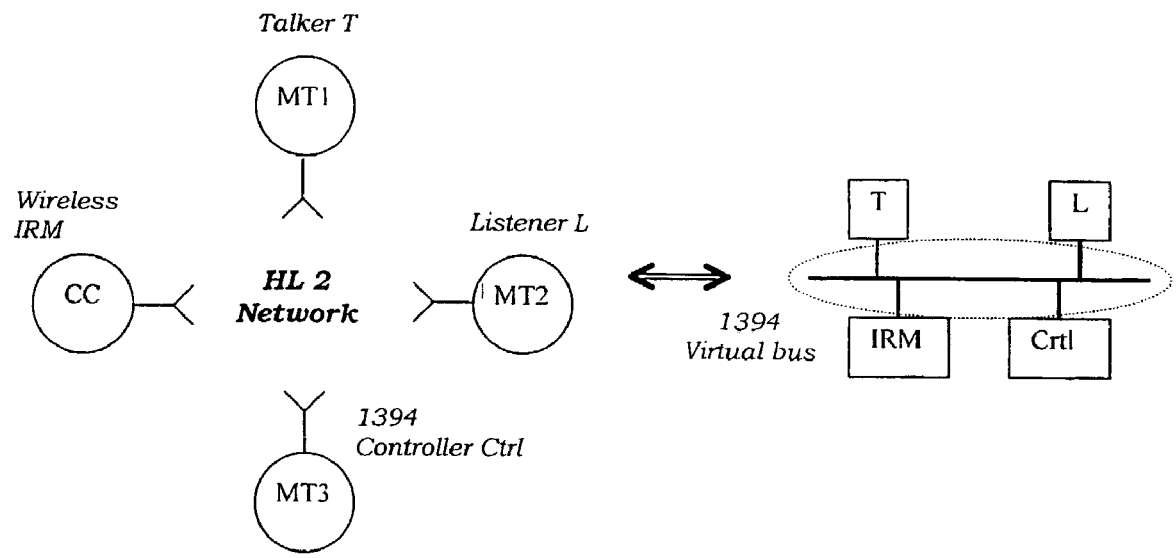
Figures 7, 8:
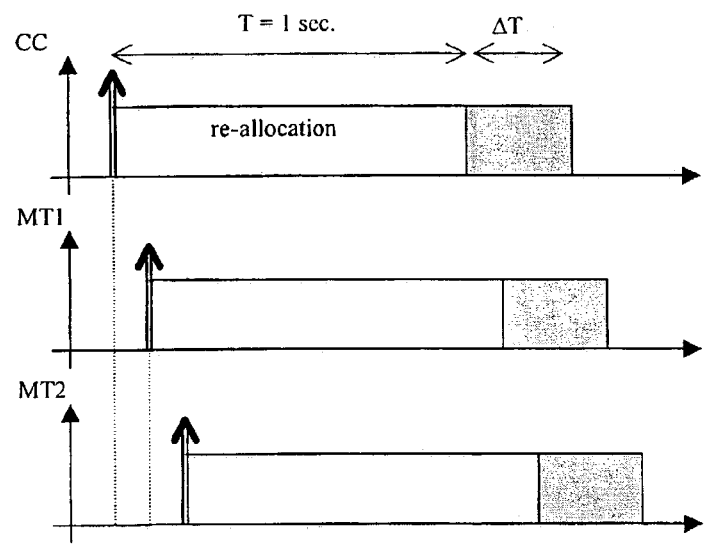
Figure 9:
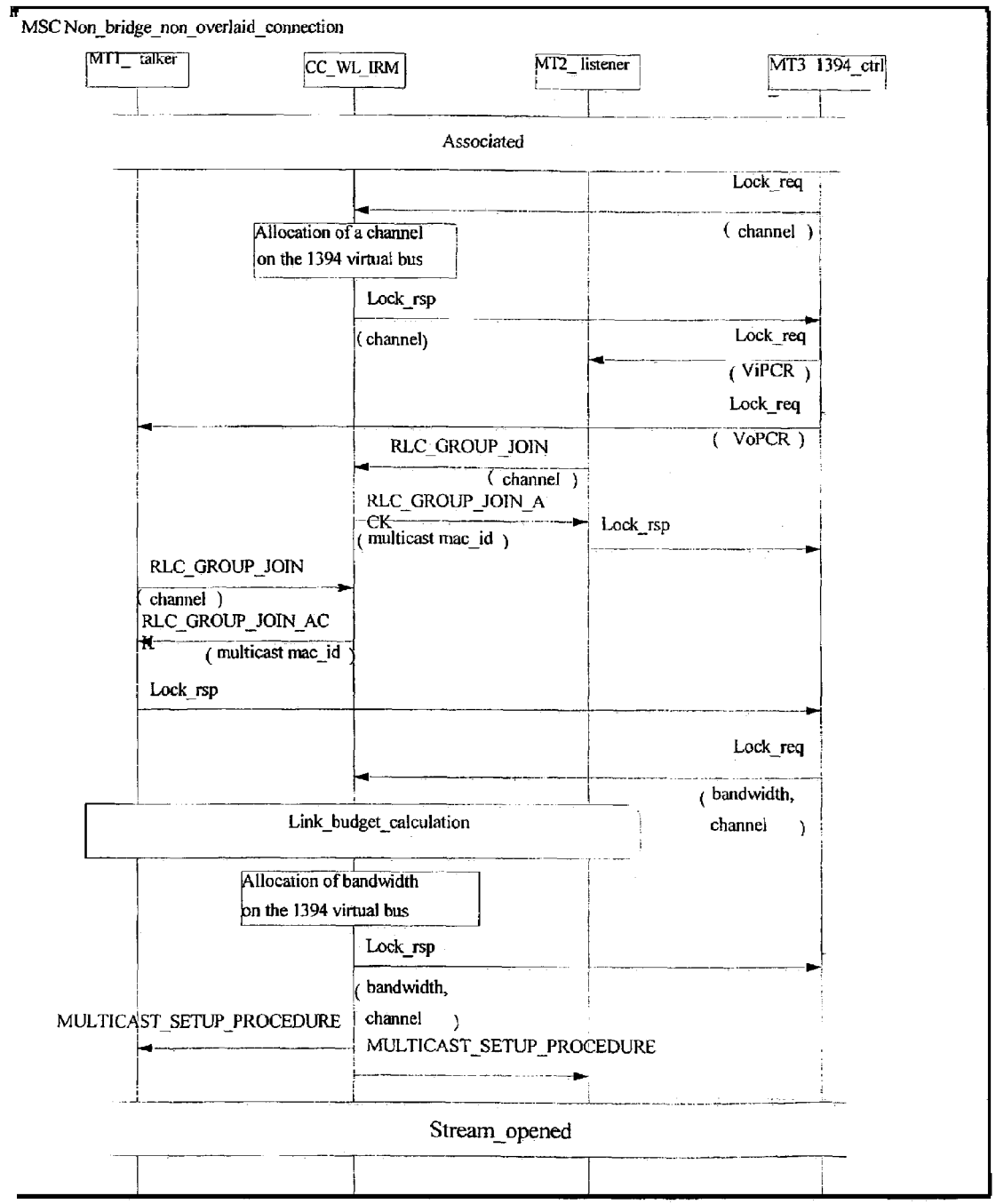
Figure 10:
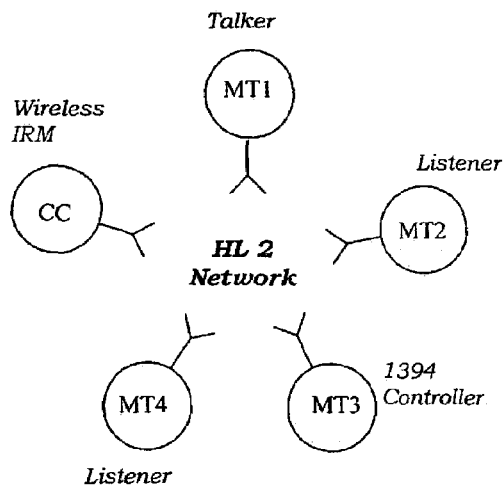
Figure 11:
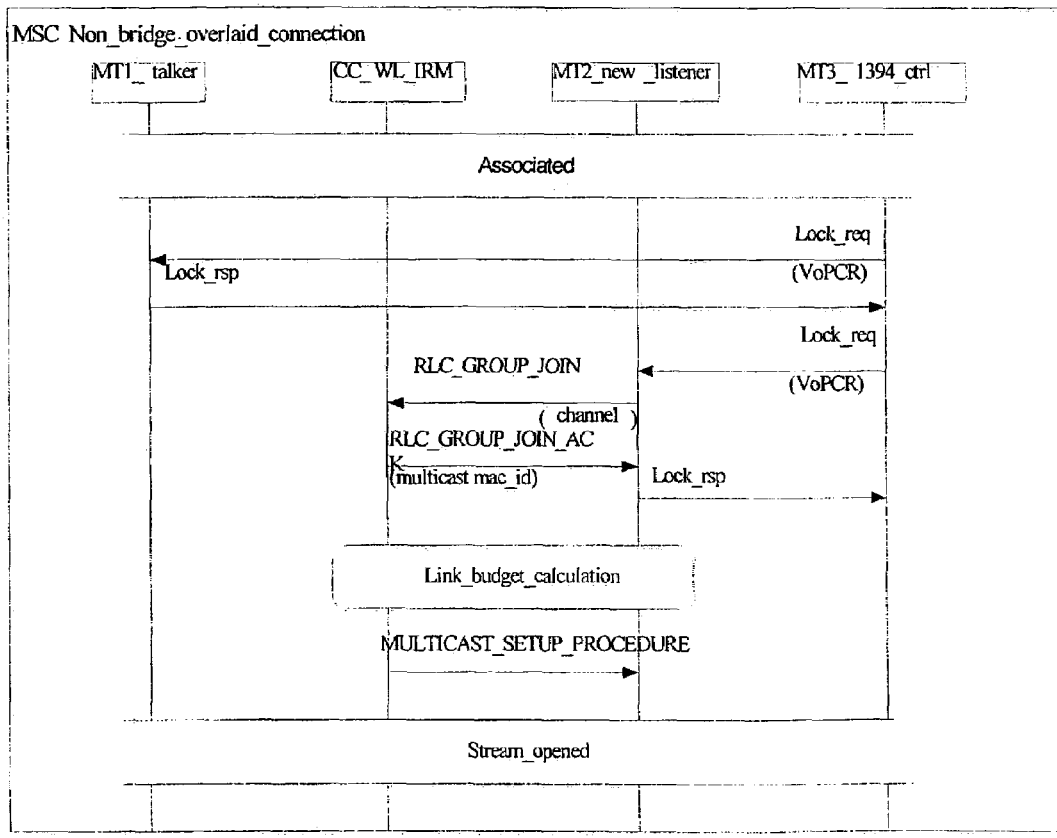
Figure 12:
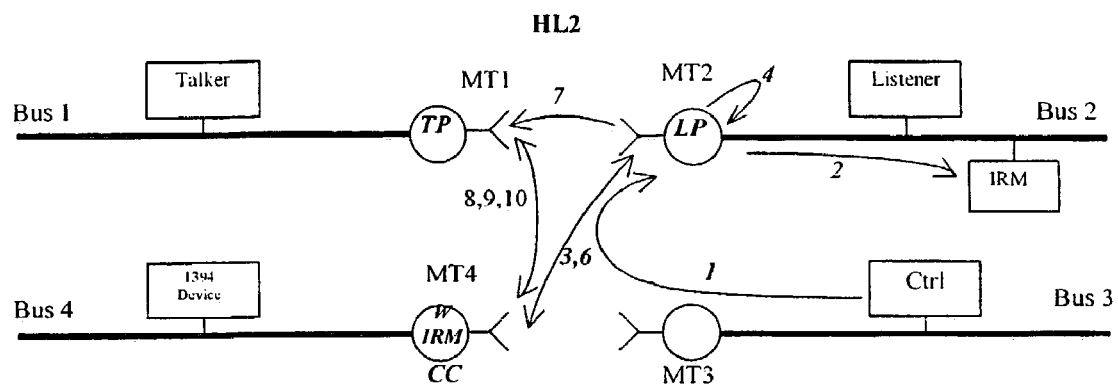
Figure 13:
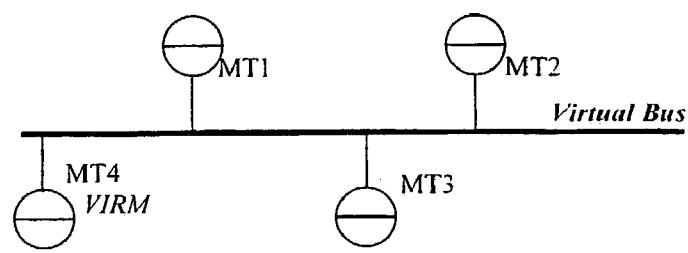

Other characteristics and advantages of the invention will appear through the description of a particular embodiment, described in relation with the figures, among which:

FIG. 1, already described, represents the general stack of Hiperlan 2,

FIG. 2, already described, shows an example of a Hiperlan 2 network as a virtual IEEE 1394 bus, FIG. 3 represents an example of a hybrid network and its modelization as a network comprising a virtual bus, FIG. 4 represents the format of the 'Virtual_Channel_Available' register according to the embodiment of the invention, FIG. 5 represents the format of the 'Virtual_Channel_Available' register, FIG. 6 represents the format of the Virtual input Plug Control Register (ViPCR), FIG. 7 represents the format of the Virtual output Plug Control Register (VoPCR), FIG. 8 represents relative T and ΔT periods (resp. representing the delay for reclaiming isochronous resources after a reset and the delay during which new reservations are forbidden following the end of the first delay) for the Hiperlan 2 Central Controller and the mobile terminals MT1 and MT2 of FIG. 3, FIG. 9 is a diagram illustrating the messages exchanged between the Central Controller and the different mobile terminals of FIG. 3 for a non-overlaid connection, FIG. 10 is a diagram of a network for an overlaid isochronous connection, in which a mobile terminal MT4 is to be overlaid onto an existing connection, FIG. 11 represents the messages exchanged between the Central Controller and the mobile terminals in this case, FIG. 12 is an example of a network architecture in a bridge environment, FIG. 13 is a diagram representing the modelization of a virtual bus.

The present embodiment concerns a network of IEEE 1394 wired buses, interconnected by wireless bridges based on Hiperlan 2. Nevertheless, it is clear to the Man Skilled in the Art that the principles described in the present document may also apply to other environments and that the invention is thus not limited to the specific environment described herein. Detailed information concerning BRAN Hiperlan 2 and IEEE 1394 bus standard and related specifications can be found among others in the following documents:

[1] ETSI BRAN Hiperlan2 Technical Specification, Data Link Control Layer, Part 1: Basic Data Transport Function.

[2] ETSI BRAN Hiperlan2 Functional Specification, Data Link Control Layer, Part 4: Extension for Home Environment.

[3] ETSI BRAN Hiperlan2 Technical Specification, Packet Based Convergence Layer, Part 3: IEEE1394 Service Specific Convergence Sublayer (draft), version 0.0.0. (1999-12).

These three documents, as well as other documents relating to Hiperlan 2, are available from the European Telecommunications Standards Institute.

[4] IEEE1394-1995 Std, IEEE Standard for a High Performance Serial Bus.

[5] IEC611883, Digital Interface for consumer Audio/Video Interface.

[6] IEEE1394.1 Draft Standard for High Performance Serial Bus Bridges (Feb. 7, 1999)

The two documents [4] and [6] are available from the IEEE organization, while the document [5] is available from the IEC.

According to the present embodiment, an isochronous resource manager (IRM) function is defined on the virtual bus of FIG. 1. The isochronous resource reservation mechanism according to the present embodiment provides functions to:

Reserve isochronous resources (channels and bandwidth)

Release these resources when either the controller, talker or listener leaves the HL2 network.

According to the present embodiment, the isochronous resource reservation mechanism is located in the Convergence layer. This allows both an application and a bridge layer to use these functions.

In the present embodiment, the IRM function is located on the Hiperlan 2 (HL2) Central Controller's 1394 Convergence layer. It provides a "channel available register" and "bandwidth available registers", so that other device applications can make resource reservations, using the appropriate lock requests ("lock_req/res"). As a difference to the IEEE 1394-1995 IRM, these registers are slightly coupled together, so that when a reservation comes for a certain amount of bandwidth, the IRM knows for which channel it is. This allows the Central Controller to compute the link budget for that channel (it knows the devices that are member of the group MAC-ID—MAC standing for Medium Access Control). If there are sufficient network resources, the IRM will generate a favorable lock_res message, otherwise it will generate a rejecting lock_res message.

At every HL2 network change (a device has been associated or de-associated) (i.e at each virtual bus reset), network resources need to be reclaimed from the IRM within one second. Else, these resources are released. In HL2, a bus reset takes some time to be propagated. According to the present embodiment, a 'bus generation number' is used in the IRM registers, so that the IRM can distinguish between a new and old resource claim and react accordingly. Bus generation number bits are specific to the HL2 IRM, and are not defined for a standard IEEE 1394-1995 bus IRM.

1. Introduction

The invention proposes adapting the management of isochronous connections of the IEEE1394-1995 bus for a HL2 network. In what follows, the term "virtual" will be used to describe the vocabulary attached to the virtual bus.

Since the data rate is lower on a wireless medium than on a real serial bus, the number of virtual channels can be limited, as an example, to 32. Of course, other values may be used.

The left part of FIG. 3 is a diagram of a wireless bus to which four devices are connected: A Central Controller (CC) and three mobile terminals MT1, MT2 and MT3, respectively acting as talking device, listening device and 1394 Controller. The right part of FIG. 3 represents the modelization of the wireless network as a virtual bus, to which the four devices are connected.

IEEE 1394 isochronous channels are mapped to multicast group Medium Access Control Identifiers ('MAC-IDs'). In the Data Link Control Layer Home Extension ('DLC HE'), there is a current limitation of the multicast channel number (the maximum number channels being 32).

According to the present embodiment, VIRM (Virtual IRM) registers are defined: V_BANDWIDTH_AVAILABLE and V_CHANNEL_AVAILABLE. These registers are present in the 1394 Convergence Layer of the Central Controller.

The following registers are also defined: ViPCR (Virtual input Plug Control registers) and VoPCR (Virtual output Plug Control Registers), for those wireless devices that can source or sink isochronous streams.

In a Hiperlan2 environment, resource management (multicast groups and network bandwidth) is done by the Central Controller.

The virtual isochronous resource manager (VIRM) may run in the Convergence Layer of any node: as on a serial bus, the IRM function may be implemented on any IRM capable node. The only requirement is that there shall be only one IRM running at a time, and that every node shall know where it is. According to the present embodiment, for simplification reasons, IRM has been located in the cycle master on a serial bus.

Also in order to simplify the protocols (nodes know where it runs, less constraints between bus_reset propagation and resource reclaim), it is proposed that the IRM runs in the Central Controller's Convergence Layer. The virtual IRM has to drive the RLC multicast connection control procedure for the HL2 network.

To comply with the IEC61883 standard (document [5]) as much as possible, it is proposed that the connection be established by an IEEE 1394 controller. A 1394 controller is a 1394 node running an application that aims at controlling other devices such as talkers and listeners. The concept of 1394 controller is defined and used in the IEC61883 standard (document [5]). This application will reserve bandwidth and channel in the VIRM and configure the virtual input and output control plug registers ('ViPCR' of the listener and 'VoPCR' of the talker) according to the following rules.

2. Control and Status Registers Description 2.1. Isochronous Resource Manager (VIRM) Registers According to the present embodiment, VIRM registers implemented in the 1394 CL of the Central Controller. Format as well as accessing rules are defined as follows according to the present embodiment:

2.1.1. VIRTUAL_CHANNEL_AVAILABLE Register

This register is implemented on the Virtual Isochronous Resource Manager (VIRM). It is two quadlets long (to be compared to the CHANNEL_AVAILABLE register of a wired serial bus IRM). Only the 2-quadlet Read and Lock compare swap transaction shall be supported in order to avoid that several applications reserve the same channel. The bits 0 to 31 of this register correspond to the isochronous channels 0 to 31 of the virtual bus. As for a serial bus IRM, a bit value of 0 indicates the corresponding channel is reserved and therefore unavailable for further reservation. According to the present embodiment, specific to the VIRM, some bits are used for the bus generation number (i.e. bits 32 to 36). Other bits are reserved.

Read and Lock compare swap transactions on this register are used by the reserving controller either to reserve a new channel or to reclaim an already reserved channel after a virtual bus reset.

FIG. 4 represents the format of the 'Virtual_Channel_Available' register.

Accessing Rules:

Virtual bus reset operation:

After a virtual bus reset (self_id packet received from the Central Controller, carrying a bus generation number), the register bits representing the available channels are cleared. All channels become available again. The 'Gen_Number' bits are updated as well (according to information present in the self_id packets sent after the bus reset and received by the node implementing the VIRM). A timer T is started. Before the timer expires, resources (channels) have to be reclaimed. In order to decide whether to accept a resource reclaim, the VIRM compares the Gen_Number bits with the corresponding bits in the Lock request. If they match, the VIRM knows that the request was made by a device present on the virtual bus before the reset and the resource reclaim request is accepted. If on the other hand, they do not match, the resource reclaim request is rejected. When the timer T expires, resources which have not been reclaimed are released (Group Mac_Ids are released in the Convergence Layer).

Standard Operation, corresponding to the period between virtual bus reset timer T expiry and next virtual bus reset:

The VIRM shall behave as any serial bus IRM. It shall reject a lock request on an already reserved channel.

When a channel is reserved (via a Lock request message) the IRM is ready to receive RLC_GROUP_JOIN messages on this channel. When the first RLC_GROUP_JOIN message is received for that channel, the Central Controller shall create a new group MAC-ID. Next RLC_GROUP_JOIN messages for the same channel will add Mobile Terminals to the same group MAC-ID.

2.1.2. VIRTUAL_BANDWIDTH_AVAILABLE Register

This register is also implemented on the VIRM. It allows a controller to reserve bandwidth for a particular channel. It is one quadlet long. Bits 27 to 31 are dedicated to the bus generation number. The other bits (0 to 26) are dedicated to express the bandwidth available on the virtual bus as a number of bits or bytes per second at the Convergence Layer level. For the bandwidth bits, some reserved values are not allowed (for example the value 0xFFFF is reserved).

A Read Request to this register allows a device to get the Bandwidth available in HL2 network.

The reservation of bandwidth is made through a Lock Request message where the arg_value is composed of two quadlets:

The first quadlet indicates the selected channel. In this word, the only bit set to 1 indicates the selected channel. The lsb corresponds to channel 0 and the msb to channel 31;

The second quadlet is composed of the result of a previous read to this register for the bits 0 to 25 and the generation number of the controller for the bits 26 to 31.

The data value is a quadlet indicating the bit rate requested for the particular channel.

The request will be rejected if:

the channel indicated in the arg_value is not available in the CHANNEL_AVAILABLE register; or the Generation number indicated in the Lock request is different from the generation number of the IRM; or the quantity of bandwidth indicated in the Lock Request is higher than the available bandwidth (another node reserved bandwidth since the reading by the controller).

Accessing Rules:

Standard Operation (period between virtual bus reset timer T expiry and next virtual bus reset):

When the IRM gets a lock request on the VIRTUAL_BANDWIDTH_AVAILABLE register, it knows the requested bandwidth as well as the channel it is for. It shall then compute the topology map (that it built from the calibration, described in clause 6.5 of document [2]) in relation to the multicast group MAC-ID (as a result of the Radio Link Control ('RLC') multicast join procedure, the Convergence Layer knows the list of Mobile Terminals for a particular 1394 channel. It can thus determine the relevant modulation scheme for this multicast group, depending of the link quality, and thus check whether there are enough available resources (HL2 time slots). If there are enough available resources, it will accept the reservation, and start a RLC multicast connection setup procedure within the multicast group. If the RLC procedure succeeds, then a favorable lock response message will be generated as an answer to the lock request message. If the reservation fails (because of a lack of link budget, or because the RLC fails), then the lock request will be rejected by a lock response message. In the argument (old_value) of the rejecting lock response message, a corresponding error code will be inserted (for example one of the forbidden values of the bandwidth available bits), so that the requester is informed of the reason of the rejection.

As for a serial bus IRM, the lock request is rejected if the bandwidth previously read during a read transsaction and inserted into the lock request message as an argument does not correspond to the current bandwidth available (two concurrent reservation procedures collide).

Virtual bus reset operation:

After a virtual bus_reset (self_id packet received from the Central Controller, carrying a generation bus number), Bandwidth_available bits are reset (all bandwidth becomes available again). Gen_Number bits are updated as well, according to information present in the self_id packets received by the VIRM. A timer T is started. Before the timer expires, resources (bandwidth) have to be reclaimed. In order to accept a resource reclaim, the VIRM uses the Gen_Number bits (if they match, resource reclaim is accepted, if they do not match, resource reclaim is rejected). When the timer T expires, then un-reclaimed resources are released (any existing multicast connection within the multicast group is released using the RLC).

FIG. 5 gives the format of the 'Virtual_Channel_Available' register.

2.1.3 ViPCR and VoPCR Virtual Input and Output Plug Control Registers

The ViPCR register (or set of registers) is implemented in a 1394 Convergence Layer of a device that can sink isochronous streams. It has the same functionality as the iPCR defined in [5]. This register is implemented according to the Command and Status Register (CSR) architecture. A generation field is added to take into account the difference of time in the Virtual Bus Reset Notification. The generation number is incremented modulo $2^5$ at each Virtual Bus Reset.

FIG. 6 represents the format of the ViPCR register.

The VoPCR register (or set of registers) is implemented in the 1394 Convergence Layer of a device that can source isochronous streams. It has the same functionality as the oPCR defined in [5]. This register is implemented according to the CSR architecture. A generation field is added to take into account the difference of time in the Virtual Bus Reset Notification (cf. [3]). The bus generation number is incremented modulo $2^5$ at each Virtual Bus Reset.

FIG. 7 represents the format of the VoPCR register.

The Payload, the Overhead ID, Point to point connection counter and the On-Line fields have the same definition as the equivalent fields of the oPCR defined in [5].

While it is coded on 6 bits in order to be coherent with document [5], the channel will be in the range of 0 to 31.

The generation number indicates the generation of the last Virtual Bus Reset received by the node. It is set by the node itself by using an incremental counter at each virtual bus reset or by using a counter associated with the virtual bus reset notification and managed by the Central Controller. This field is necessary because all the Wireless Terminals are not informed of a virtual bus reset at the same time.

Accessing rules for the Vo and Vi PCR registers:

Standard Operation (period between a virtual bus reset timer T expiry and the next virtual bus reset):

When a Convergence Layer of a node receives a lock request on a PCR (either input or output) and with the channel bits set, then a RLC join request procedure shall be started to the Central Controller. Once the RLC join response message is positively received, then a successful lock response message is generated. Otherwise, the lock request is rejected.

Bus reset operation: when the Convergence Layer implementing the PCR is informed of a bus reset, it sets the Gen_bus_number bits of its PCR(s) to the new value. The Convergence Layer starts a timer for the interval T, and operates sink or source data as it did before the bus reset. It also clear the channel bits of the PCRs. If channel bits are written again before the T timeout, nothing changes. Otherwise, the Convergence Layer will generate an RLC_Leave procedure towards the Central Controller to leave the multicast group.

Accessing rules (seen from the point of view of the controller application):

The application first reserves a channel with the IRM (by reading the VIRTUAL_CHANNEL_AVAILABLE register, followed by a lock request), then writes the reserved channel into the ViPCRs and VoPCR of the nodes of the multicast group it wants to establish. Once all the lock response messages have been obtained, it reserves the relevant bandwidth by sending a lock request message to the VIRTUAL_BANDWIDTH_AVAILABLE register. Then the VIRM can safely compute the link budget for that multicast group.

When a virtual bus reset occurs, the application has to reclaim resources from the IRM registers and the relevant Vo or ViPCRs within the one second interval. It then stops sending any new reservation requests for a period $\Delta T$, as described below.

2.2 Virtual Bus Reset and Resource Reclaim or Release
Virtual Bus Reset Operation When the HL2 Radio Link Control layer of a Central Controller detects that either a device has left the network, or that a new device has been associated (following a RLC association procedure), the identification ('self_id') procedure at the 1394 Convergence Layer level ensures that the Central Controller sends a virtual bus reset message to all other device Convergence Layers. Each 1394 Convergence Layer can thus generate a virtual bus reset to its upper layer triggered by the reception of the virtual bus reset message, with a certain propagation delay.

Each device contains memory dedicated to storing a virtual bus reset number which is the already mentioned generation number. The bus generation number is increased by the Central Controller at each bus reset. The bus reset generation number is contained in the self_id messages.

When a controller receives a bus reset indication, it has to re-allocate all its connections within one second. After this time, it is not allowed to send either reclaim or normal claim messages during a period $\Delta T$. But a device can receive and accept a request during this period $\Delta T$ (see FIG. 8).

This time interval $\Delta T$ shall be longer than the difference of time between the bus reset event on the Central Controller and the bus reset event on the last Mobile Terminal receiving the reset. That principle guarantees that a Mobile Terminal will never try to reclaim a resource after the end of the bus reset on a device.

As for the split timeout register, it is proposed that Convergence Layers contain a $\Delta T$ Control and Status Register ('CSR'), so that a Central Controller can adjust this value if it becomes overloaded in Mobile Terminals (if the number of MT increases by an important factor, the bus reset may take more time than the $\Delta T$ period, so that the resource reservation may sometimes fail (i.e. generate another bus reset). Thus in some cases it may be advantageous to increase this value). $\Delta T$ CSR (as for the split timeout of 1394) will have a default value.

If for some reason, the bus reset requires a longer time than $\Delta T$ to be propagated in a HL2 network, then the Central Controller has to increase the bus reset generation number and start another a bus reset.

FIG. 8 represents the relative T and $\Delta T$ periods for the Central Controller and the mobile terminals MT1 and MT2 of FIG. 3.

When the 1394 Convergence Layer of the Central Controller starts a bus reset sequence, then it has to free all the bandwidth and channels within the virtual IRM. At the same time, when devices receive the virtual bus reset, ViPCR and VoPCR will have to be released and a timer $T=(1s+\Delta T)$ initialized.

Several cases may occur after a virtual bus reset:

No Device Gone

The controller that allocated resources prior the bus reset and that receives a bus reset has to check whether both the talker and the listener are still on the network. If they are, then the controller has to reallocate resources in the VIRM. The VIRM uses the bus generation number bits to detect that the lock request is a reclaim and not a new claim (that could have been generated by a device before it actually received the bus reset). The controller will also have to reconfigure the ViPCR of the listeners and the VoPCR of the talker.

In this case, the HL2 connections are not released and can continue to operate.

1394 Controller is Gone

The IEC61883 document specifies that if the controller is disconnected, then a connection established by this controller is to be broken. According to the present embodiment, the virtual IRM will wait during the time interval T for the reclaiming. When the time runs out without a reclaim being received, the Central Controller sends RLC_RELEASE messages to the talker and each listener. The talker and the listeners will leave the multicast group. As no devices will remain in the multicast group, the CC will free the reserved resources in the registers. In a similar way, the talker and the listener of this connection (i.e. the connection that was established by a controller that has been removed from the bus) will detect that no resource reclaim has been made in their PCR, will have to leave the multicast group by sending a RLC_LEAVE to the CC.

Talker or Listeners Gone

A connection should be broken if either the talker is missing or all listeners left the network. The 1394 controller will try to find the talker and listeners, and if this condition is not respected then it will not reallocate necessary resources.

Each device will manage the time out and will have to release the HL2 connections.

2.3 Non Bus Reset Resource Release

As on a serial bus, an application (or bridge layer) may decide at any time to release some resources on the virtual bus. This shall be done in a fashion similar to that of the reservations (writing into the PCRs and IRM registers to release some bandwidth for a particular channel, and then release some channels).

2.4 Scenarios 2.4.1. Isochronous Connection Between Wireless Devices.

2.4.1.1. Non Overlaid Connection.

(1) The 1394 controller performs a compare and swap transaction to the Virtual Isochronous Resource Manager located in the Central Controller in order to allocate the channel. This is an IEEE1394-1995 transaction.

(2) The controller sends a lock_req message to the talker and the listeners at the ViPCR and VoPCR (with online bit set to off) addresses to set the channel of the previous step. If its generation number is different from the controlled device, the controller is not able to establish a connection, resulting in a rejecting lock_res message generated with an appropriate <<error code>>.

(3) Both the talker and the listeners perform the Join RLC procedure on this channel. After the Join is completed, both the talker and the listeners generate the favorable lock_resp to the controller.

(4) When the controller gets the lock_resp, the Central Controller knows which devices are members of the multicast group. The controller can then send a lock_req on the BANDWIDTH_AVAILABLE register (according to the procedure described in above).

(5) The IRM calculates the required HL2 bandwidth (depending on the link budget, and the selected physical layer (PHY) mode).

(6) Two cases are possible:

(a) Bandwidth is available, then go to (7) the IRM sends a positive lock response and then immediately after (before accepting a new lock_req) updates the bandwidth register (taking the PHY mode into account)

(b) Bandwidth is not available: the IRM sends a negative lock response (with the appropriate error code in the arg_value). The bandwidth register remains unchanged—The controller knows (via the error code) that it shall not loop in asking.

(7) If bandwidth was available, the Central Controller starts a multicast DLC User Connection (DUC) setup into the multicast group. If RLC succeeds, then a positive lock response is generated (the bandwidth available register is updated taking the PHY mode into account), else a negative one is generated.

(8) Generally, no other lock request is accepted until the corresponding lock response is generated.

FIG. 9 is a diagram illustrating the messages between the Central Controller and the different mobile terminals of FIG. 3 for a non-overlaid connection.

2.4.1.2. Overlaid Connections.

An overlaid connection is defined in the IEC 61883 specification. Overlaying a connection consists in adding listeners to an already existing connection. In that case, there already are a HL2 multicast connection and IRM CSR in the 1394 convergence layer.

FIG. 10 is a diagram of a network for an overlaid isochronous connection, in which a mobile terminal MT4 is to be overlaid onto an existing connection.

The following steps describe how the device MT4 becomes a new listener:

(1) The controller sets the VoPCR of the talker to increment the point to point connection counter. It also loads the ViPCR of the new listener with the channel by sending a lock_req and checking generation number.

(2) MT4 can now send a RLC_GROUP_JOIN message to the Central Controller for the corresponding channel.

(3) If the Link Budget allows to add MT4 to join the group multicast, the Central Controller sends back the acknowledgement with the associated multicast MAC_ID.

(4) Both listeners and talker can send the lock_resp to the controller.

(5) The Central Controller shall send a multicast DUC setup procedure to the MT4 device. The device MT4 is then ready to receive data. Possibly, if the PHY mode needs to be changed, a RLC modify procedure may even be started FIG. 11 represents the messages exchanged between the Central Controller and the mobile terminals in this case.

2.4.2. Isochronous Connection Setup in a Bridge Environment

The following part describes how the isochronous reservation mechanisms, as defined in the 1394 Convergence Layer, may be used in a bridge environment.

The network is composed of four serial buses numbered from 1 to 4 connected to the Hiperlan 2 network through the portals MT1 to MT4 (cf. FIG. 12).

FIG. 12 is an example of a network architecture in a bridge environment.

The wireless network can be modelized as a virtual 1394 bus (cf. FIG. 13). Each portal is represented as bridge connected to the Virtual Bus. Such a bridge is made of:

a portal connected to the wired serial bus: this is the real portal a portal connected to the virtual bus: this is a virtual portal which uses the services of the 1394 Convergence Layer (i.e. Virtual iPCR and oPCR registers). The IRM of the virtual bus is noted VIRM and is implemented in the 1394 Convergence Layer of the Central Controller. Moreover, the device which is in charge of establishing an isochronous connection on the virtual bus is called Virtual Controller.

FIG. 13 is a diagram representing the modelization of a virtual bus.

2.4.2.1. Non Overlaid Connections

The different steps are as follows:

(1) The controller sends a Connect Message to the Listener's Portal. The virtual portal of this device becomes the Virtual Controller for the establishment of the connection on the virtual bus.

(2) The virtual Controller reserved resources on the virtual bus as described in the previous sections.

(3) If resources are available on the virtual bus, the Listener portal (LP) sends a bridge connect message to the talker portal, . . . as described in P1394.1 drafts.

2.4.2.2 Overlaid Connection

The controller sends a Connect Message to the Listener's Portal. This connect message shall contain the information that this is an overlaid connection by indicating the existing channel number in use.

The Listening Portal sets the allocated channel bit of its ViPCR and set the VoPCR of the talker's portal by sending a lock_req message. The talker's portal shall increase the point_to_point_connection_counter in its VoPCR.

On the virtual bus everything happens then as for an overlaid connection.

Acronyms and Abbreviations.

Bridge: a set of two serial bus nodes capable of connecting two buses in a serial bus net.

Central Controller (CC): Provides control functionality for the DLC layer (Data Link Control layer) equivalent to that of an access point as defined by Hiperlan 2, but is not necessarily attached to a fixed network. The central controller functionality may be embedded in a wireless device.

Controller: the device that establishes an isochronous connection on a Serial Bus.

Portal: a node that connects a bridge to a Serial Bus.

Virtual Bus: it is the model of the wireless network as a 1394 Serial Bus.

The invention claimed is:

1. Method for reserving isochronous resources on a wireless network for connection set-up, said network comprising an isochronous resource manager and a central controller device, said method comprising the steps of:

identifying a talker device and a listener device by a connection controller;

acquiring, by the isochronous resource manager, a list of devices to be part of the connection;

determining bandwidth required for connecting the talker device and the listener device by the isochronous resource manager, as a function of the list of devices to be part of the connection;

setting-up a multicast group including the talker device and the listener device if said bandwidth is available.

2. Method according to claim 1, wherein the step of acquiring the list of devices to be part of the connection by the isochronous resource manager further includes:

requesting a channel identifier by the connection controller from the isochronous resource manager;

transmitting, by the connection controller, the channel identifier to the talker device and the listener device;

each device carrying-out a radio link control layer group join procedure with the central controller of the network, based on the channel identifier;

the central controller attributing multicast medium access control identifier (MAC-ID) to said group.

3. Method according to claim 1, comprising the steps of, after a reset of the wireless network, providing a first time interval during which controllers are required to reclaim isochronous resources reserved before the reset, and providing a second time interval following the first interval and during which a connection controller may not make new reservations with the isochronous resource manager.

4. Method according to claim 3, wherein the second time interval is set to allow all devices of the network to finish their reset procedure after a network reset triggered by the central controller.

5. Method according to claim 3, wherein connection controllers comprise a register for storing the second time interval, this register being programmable by the central controller of the network.

6. Method according to claim 3, wherein during the second time interval, a connection controller may not make any reclaim of resources reserved before the reset procedure.

7. Method according to claim 1, wherein the isochronous resource manager is implemented in the central controller.

8. Method according to claim 1, further comprising the steps of:

providing, in each device, a bus generation register with a content having the central controller update the content of the bus generation register of a device during a network reset, the new register content being sent in a network reset message to the device, having the isochronous resource manager test for the latest value of the bus generation register content in a resource request from a device and reject the request if the bus generation register content of the device is not correct.

9. The method according to claim 1, wherein the network is of a Hiperlan 2 type.

10. A controller for reserving isochronous resources on a wireless network for connection set-up, comprising:

a connection controller coupled to said network and identifying a talker device and a listener device; and an isochronous resource manager acquiring a list of devices to be part of the connection, determining bandwidth required for connecting the talker device and the listener device, as a function of the list of devices to be part of the connection, and setting-up a multicast group including the talker device and the listener device if said bandwidth is available.

11. The controller of claim 10, wherein the connection controller requests a channel identifier from the isochronous resource manager and transmits the channel identifier to the talker device and the listener device, and wherein each device executes a radio link control layer group join procedure with the controller, based an the channel identifier, and the controller providing a multicast medium access control identifier (MAC-ID) to said group.

12. A computer readable medium having computer executable instructions for reserving Isochronous resources on a wireless network for connection set-up, said computer executable instructions causing a computer to execute the steps of:

identifying a talker device and a listener device;

acquiring a list of devices to be part of the connection;

determining bandwidth required for connecting the talker device and the listener device, as a function of the list of devices to be part of the connection; and setting-up a multicast group including the talker device and the listener device if said bandwidth is available.

13. The computer readable medium of claim 12, wherein the executing of the acquiring step further includes the executing of:

transmitting a channel identifier to the talker device and the listener device;

executing a radio link control layer group join procedure with each device, based on the channel identifier; and providing a multicast medium access control identifier (MAC-ID) to said group.

* * * * *